US012645067B2

(12) United States Patent　　(10) Patent No.:　US 12,645,067 B2
Takao et al.　　(45) Date of Patent:　Jun. 2, 2026

(54) OPTICAL SCANNING DEVICE

(71) Applicant: STANLEY ELECTRIC CO., LTD.,
Tokyo (JP)

(72) Inventors: Yoshifumi Takao, Tokyo (JP); Makoto Sakurai, Tokyo (JP); Katsunori Nakazawa, Tokyo (JP); Naoya Matsumaru, Tokyo (JP); Atsushi Yamamoto, Tokyo (JP); Nazirul Afham Idris, Tokyo (JP)

(73) Assignee: STANLEY ELECTRIC CO., LTD.,
Tokyo (JP)

( * ) Notice: Subject to any disclaimer, the term of this patent is extended or adjusted under 35 U.S.C. 154(b) by 286 days.

(21) Appl. No.: 18/562,009

(22) PCT Filed: Apr. 18, 2022

(86) PCT No.: PCT/JP2022/018037
§ 371 (c)(1),
(2) Date: Nov. 17, 2023

(87) PCT Pub. No.: WO2022/244571
PCT Pub. Date: Nov. 24, 2022

(65) Prior Publication Data
US 2024/0241367 A1　　Jul. 18, 2024

(30) Foreign Application Priority Data

May 20, 2021　(JP) ................................. 2021-085237

(51) Int. Cl.
G02B 26/08　　(2006.01)
(52) U.S. Cl.
CPC ............................... *G02B 26/0833* (2013.01)

(58) Field of Classification Search
CPC ................ G02B 26/0833; G02B 5/005; G02B 2027/0118; G02B 2027/0178; G02B 27/0172
See application file for complete search history.

(56) References Cited

U.S. PATENT DOCUMENTS 5,347,121 A * 9/1994 Rudeen .................. G02B 5/005
　　　　　　　　　　　　　　235/462.35
6,002,507 A 12/1999 Floyd et al.
(Continued)

FOREIGN PATENT DOCUMENTS

CN　　109437088 A　　3/2019
JP　　2006194973 A　　7/2006
(Continued)

OTHER PUBLICATIONS

Notice of Allowance dated Aug. 27, 2025, issued in related U.S. Appl. No. 18/273,457.
Office Action (Non-Final Rejection) dated Aug. 26, 2025, issued in related U.S. Appl. No. 18/277,084.
International Search Report (ISR) (and an English language translation thereof) dated Jul. 5, 2022, issued in International Application No. PCT/JP2022/018037.
(Continued)

*Primary Examiner* — Mariam Qureshi
(74) *Attorney, Agent, or Firm* — Holtz, Holtz & Volek PC

(57)　　ABSTRACT

An optical scanning device includes a light source and a MEMS optical deflector mounted on the same substrate, at least one optical path generation mirror configured to generate an optical path which causes a light beam emitted from the light source to enter the MEMS optical deflector, and a lens arranged between the light source and the first optical path generation mirror. A shielding plate has an elliptical aperture and is attached to the optical path generation mirror. The light beam from the lens has a peripheral edge on a cross section thereof, which is cut by the elliptical aperture.

6 Claims, 11 Drawing Sheets

(56) References Cited

U.S. PATENT DOCUMENTS

| | | | |
|---|---|---|---|
| 6,014,240 | A | 1/2000 | Floyd et al. |
| 6,715,685 | B2 | 4/2004 | Dvorkis |
| 7,428,995 | B1 | 9/2008 | Stern et al. |
| 8,228,608 | B2 | 7/2012 | Yamamoto |
| 9,097,895 | B2 | 8/2015 | Ikegami |
| 10,341,607 | B2 | 7/2019 | Komatsu et al. |
| 2002/0170967 | A1 | 11/2002 | Dvorkis |
| 2004/0240205 | A1 | 12/2004 | Hayakawa et al. |
| 2008/0049289 | A1 | 2/2008 | Urakawa et al. |
| 2009/0231687 | A1 | 9/2009 | Yamamoto |
| 2010/0149073 | A1 | 6/2010 | Chaum et al. |
| 2011/0211260 | A1 | 9/2011 | Yamamoto |
| 2012/0300276 | A1 | 11/2012 | Ohnishi |
| 2014/0146394 | A1 | 5/2014 | Tout et al. |
| 2019/0004325 | A1 | 1/2019 | Connor |
| 2019/0353897 | A1* | 11/2019 | Suzuki ............... G02B 27/0081 |
| 2019/0370450 | A1 | 12/2019 | Fletcher et al. |

FOREIGN PATENT DOCUMENTS

| | | | |
|---|---|---|---|
| JP | 2009244869 | A | 10/2009 |
| JP | 2010117542 | A | 5/2010 |
| JP | 2010175677 | A | 8/2010 |
| JP | 2012208157 | A | 10/2012 |
| JP | 2013029700 | A | 2/2013 |
| JP | 2013046143 | A | 3/2013 |
| JP | 2014056020 | A | 3/2014 |
| JP | 2015022158 | A | 2/2015 |
| JP | 2017207630 | A | 11/2017 |
| JP | 2018116219 | A | 7/2018 |
| JP | 2019211705 | A | 12/2019 |
| JP | 6734532 | B2 | 7/2020 |
| KR | 100648929 | B1 | 11/2006 |
| WO | 03019463 | A1 | 3/2003 |

OTHER PUBLICATIONS

Written Opinion dated Jul. 5, 2022, issued in International Application No. PCT/JP2022/018037.

International Search Report (ISR) (and English translation thereof) dated Apr. 12, 2022, issued in International Application No. PCT/JP2022/002452.

International Search Report (ISR) (and English translation thereof) dated Jun. 21, 2022, issued in International Application No. PCT/JP2022/018040.

Related U.S. Appl. No. 18/273,457, First Named Inventor: Makato Sakurai; Title: "Optical Scanning Device", filed Jul. 20, 2023.

Related U.S. Appl. No. 18/277,084, First Named Inventor: Makato Sakurai; Title: "Eyeglass-Type Video Display Device", filed Aug. 14, 2023.

Related U.S. Appl. No. 18/290,291, First Named Inventor: Atsushi Yamamoto; Title: "Optical Scanning Device and Manufacturing Method", filed Nov. 11, 2023.

Written Opinion dated Apr. 12, 2022, issued in International Application No. PCT/JP2022/002452.

Written Opinion dated Jun. 21, 2022, issued in International Application No. PCT/JP2022/018040.

International Search Report (ISR) (and and English language translation thereof) dated Apr. 12, 2022, issued in International Application No. PCT/JP2022/002450.

Written Opinion dated Apr. 12, 2022, issued in International Application No. PCT/JP2022/002450.

U.S. Appl. No. 18/290,291, filed Nov. 11, 2023.

U.S. Appl. No. 18/273,457, filed Jul. 20, 2023.

U.S. Appl. No. 18/277,084, filed Aug. 14, 2023.

"Supplementary European Search Report (SESR) dated Nov. 26, 2024, issued in counterpart European Application No. 22804485.5".

* cited by examiner

OPTICAL SCANNING DEVICE

TECHNICAL FIELD

The present invention relates to an optical scanning device having a MEMS optical deflector.

BACKGROUND ART

Patent Literature 1 discloses an optical scanning device having a MEMS optical deflector. The optical scanning device is attached to a temple (side support) on one side of a spectacles-type head mount, emits scanning light from the MEMS optical deflector toward lenses and half mirrors arranged toward the front (front frame) of the spectacles, and projects an image on the user's retina by the scanning light reflected by the half mirror.

According to the schematic diagram of Patent Literature 1, the lens and the half mirror are mounted on the temple in addition to the optical scanning device, and the optical scanning device faces the half mirror with the lens interposed therebetween. Laser light emitted from the optical scanning device scans on the half mirror along the mirror surface thereof, is reflected by the mirror surface, and projects an image onto the retina of a user's eye.

CITATION LIST

Patent Literature

Patent Literature 1: Japanese Patent No. 6734532

SUMMARY OF INVENTION

Technical Problem

Patent Literature 1 does not disclose in what positional relationship, the light source, the MEMS optical deflector, and the substrate are mounted in the optical scanning device specifically.

An object of the present invention is to provide an optical scanning device which has improved the quality of a light beam emitted as scanning light.

Solution to Problem

An optical scanning device of the present invention includes:

a substrate, a light source which is mounted on the substrate and emits a light beam, a MEMS optical deflector which has a mirror portion whose upper surface side is a mirror surface, and an actuator which reciprocally rotates the mirror portion around an axis, and is mounted on the substrate, at least one optical path generation mirror configured to generate an optical path which causes the light beam emitted from the light source to enter the mirror portion of the MEMS optical deflector, a lens arranged between the light source and the optical path generation mirror on which light emitted from the light source first enters in the optical path, and a first shielding plate, with any of the optical path generation mirrors as a corresponding optical path generation mirror in the optical path, including a first elliptical aperture arranged in the same inclining direction as the inclining direction of the corresponding optical path generation mirror upstream of the corresponding optical path generation mirror and with respect to an optical axis of the optical path.

Advantageous Effects of Invention

According to the present invention, a shielding plate arranged for a corresponding optical path generation mirror has an aperture. Thus, a light beam can be improved into a light beam with high contrast as a result of cutting a peripheral low brightness area by the aperture.

DESCRIPTION OF EMBODIMENTS

Figure 1A:
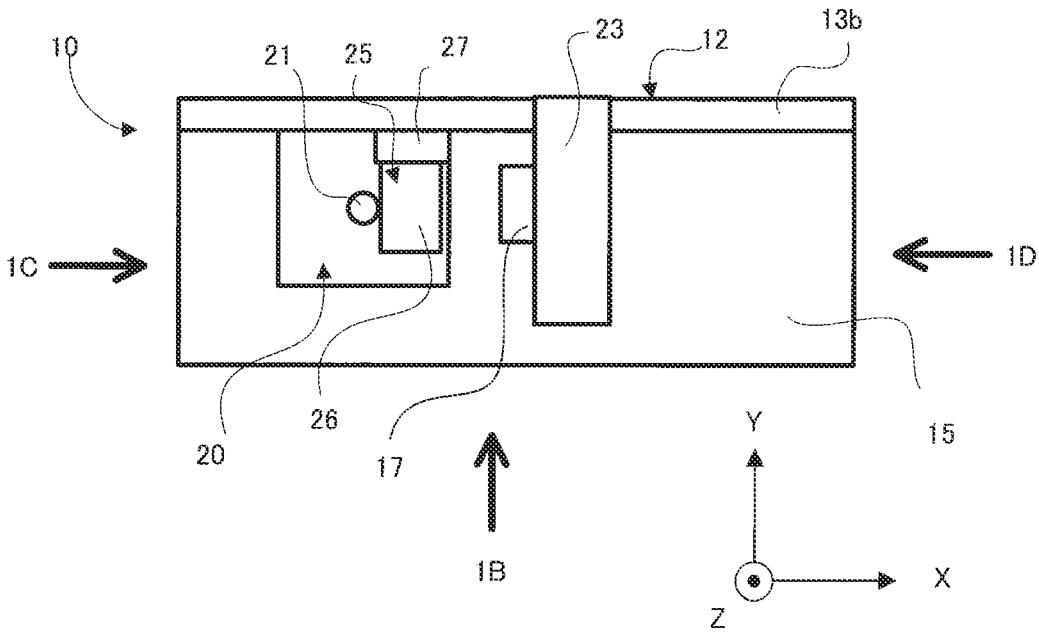
FIG. 1A is a plan view of an optical scanning device.

A plurality of preferred embodiments of the present invention will be described in detail with reference to the drawings. It goes without saying that the present invention is not limited to the following embodiments. In addition to the following embodiments, the present invention includes various configuration modes within the scope of the technical idea of the present invention. The same elements are given the same reference numerals through all the drawings.

(Overall Configuration)

Figure 1B:
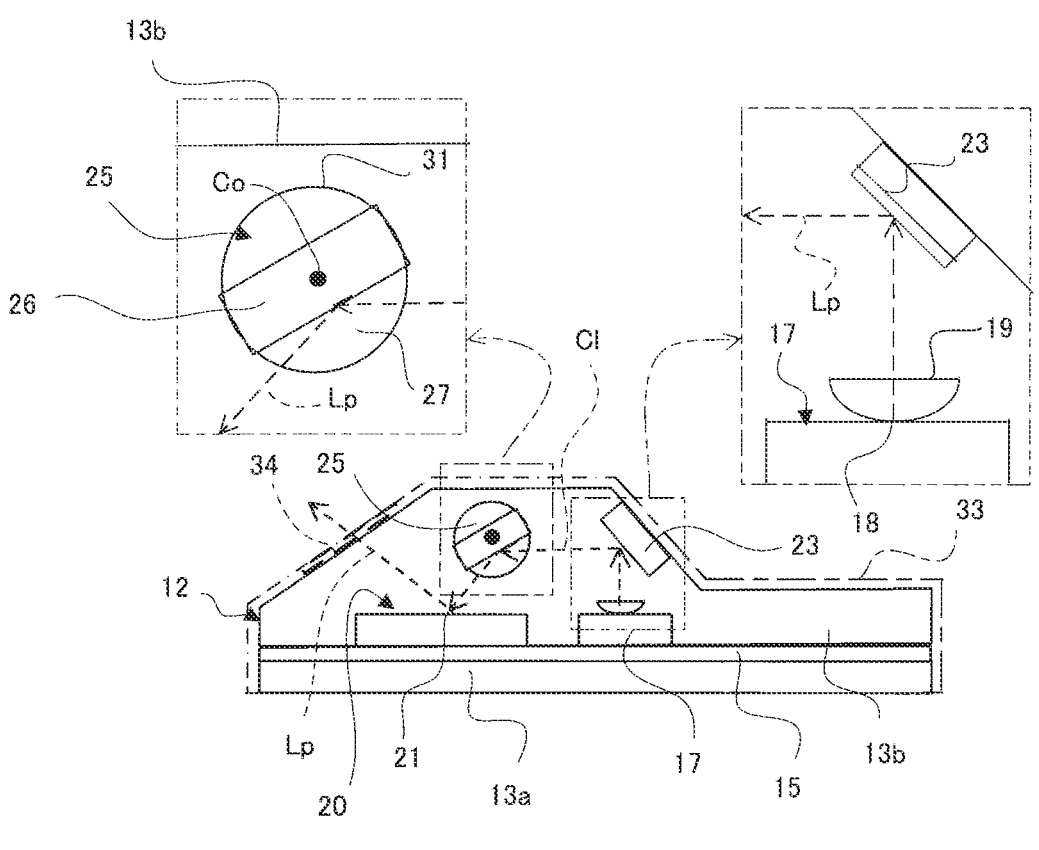
FIG. 1B is a view taken along arrow 1B in FIG. 1A.
Figure 1B:
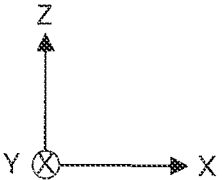
Figure 1C:
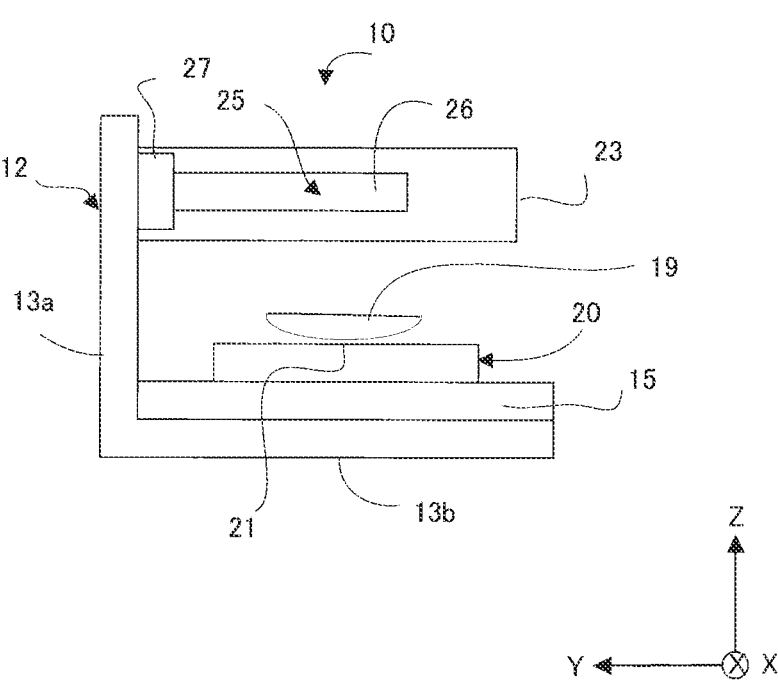
FIG. 1C is a view taken along arrow 1C in FIG. 1A.
Figure 1D:
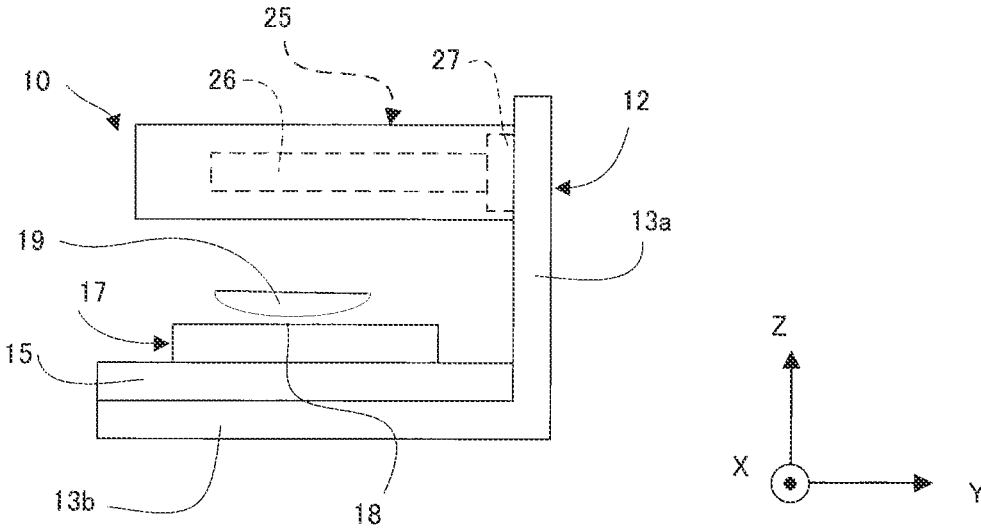
FIG. 1D is a view taken along arrow 1D in FIG. 1A.

FIG. 1A is a plan view of an optical scanning device 10, FIG. 1B is a view taken along arrow 1B in FIG. 1A, FIG. 1C is a view taken along arrow 1C in FIG. 1A, and FIG. 1D is a view taken along arrow 1D in FIG. 1A. Incidentally, FIGS. 1A to 1D show the optical scanning device 10 with a cover 33 (one-dot chain line in FIG. 1B) removed.

The optical scanning device 10 includes a support frame body 12. The support frame body 12 has an L-shaped cross-sectional contour, and has a bottom plate portion 13a and an uprising plate portion 13b which are vertically connected. A substrate 15 is rectangular and placed onto and fixed to an upper surface of the bottom plate portion 13a.

For convenience of description, a three-axis orthogonal coordinate system is defined. An X-axis and a Y-axis are defined as axes in the directions parallel to the longitudinal direction (direction parallel to the long side) and the lateral direction (direction parallel to the short side) of the substrate 15, respectively. A Z-axis is defined as an axis parallel to the uprising direction of the uprising plate portion 13b from the substrate 15.

Lp indicates a light beam. The course of the light beam Lp means an optical path of the light beam Lp. C1 is an optical axis as a central axis of the optical path of the light beam Lp. The optical path is static between a VCSEL 17 and a MEM optical deflector 20. Since the light beam Lp is emitted from the MEM optical deflector 20 as scanning light, an optical path on the downstream side from the MEMS optical deflector 20 becomes dynamic.

In the optical scanning device 10, the light beam Lp is emitted from the left side of FIG. 1B, i.e., from the negative end of the optical scanning device 10 in the X-axis direction. Therefore, in the X-axis, the negative side and the positive side will be appropriately referred to as the front and rear of the optical scanning device 10, respectively. Further, since the positive side and the negative side in the Z-axis direction are respectively taken as an upper surface and a lower surface in the substrate 15, the positive side and the negative side in the Z-axis direction will be appropriately defined as above and below the optical scanning device 10.

The VCSEL 17 and the MEMS optical deflector 20 are mounted on the upper surface of the substrate 15 with the X-axis direction as an arrangement direction. The VCSEL 17 has an emission unit 18 on its upper surface and emits laser light upward, i.e., just above in parallel to the Z-axis direction from the emission unit 18. The MEMS optical deflector 20 directs a mirror surface of a rotating mirror 21 upward.

Incidentally, although the MEMS optical deflector 20 is a two-dimensional scanning MEMS optical deflector in the present embodiment, it may be a one-dimensional scanning MEMS optical deflector. The configuration of the MEMS optical deflector itself is known in various ways. For example, the MEMS optical deflectors described in Japanese Patent Application Laid-Open No. 2017-207630 (two-dimensional scanning MEMS optical deflector) and Japanese Patent Application Laid-Open No. 2014-056020 (one-dimensional scanning MEMS optical deflector) are selected.

A lens 19 (FIG. 1B) is arranged directly above the emission unit 18 in proximity to the emission unit 18. In FIGS. 1A to 1D, the VCSEL 17 is illustrated as a single body, but in an actual product, it is enclosed in a package (not shown). The package which encloses the VCSEL 17 therein is made of a transparent material such as quartz glass at a portion through which the light beam from the emission unit 18 is emitted (for example: Japanese Patent No. 4512330 and Japanese Patent Application Laid-Open No. 2009-027088). The lens 19 is fixed (for example, glued) to an inner or outer surface of such a transparent material, or a transparent part itself thereof is processed as a lens, so that the position directly above the emission unit 18 is held.

Figure 2:
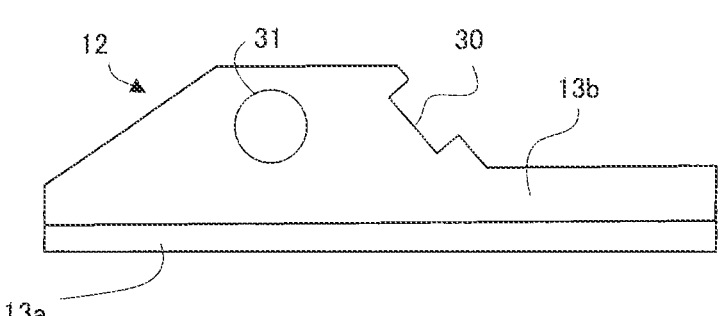
FIG. 2 is a side view of a support frame body.

FIG. 2 is a side view of the support frame body 12. Description will be made about the support frame body 12, a plate-like mirror 23, and a rotary type mirror 25 with reference to FIGS. 1A to 1D and FIG. 2.

The uprising plate portion 13b of the support frame body 12 has an inclined groove 30 and a through hole 31. The inclined groove 30 has a rectangular cross section and opens obliquely rearward upward along the side contour of the uprising plate portion 13b. A bottom surface of the inclined groove 30 is formed of an inclination surface inclined at 45° with respect to the substrate 15. The through hole 31 is formed as a cylindrical hole penetrating through the uprising plate portion 13b in the Y-axis direction.

In the X-axis direction, the center of the width (length in side view in FIG. 1B) of the inclination surface (bottom surface) of the inclined groove 30 is located at the same position as the emission unit 18 of the VCSEL 17. In the X-axis direction, a center line Co of the cylindrical hole of the through hole 31 is positioned between the VCSEL 17 and the rotating mirror 21 of the MEMS optical deflector 20 in the X-axis direction. The center of the length of the inclination surface of the inclined groove 30 and the center line of the cylindrical hole of the through hole 31 are located at the same position in the Z-axis direction, that is, at the same height from the substrate 15.

The plate-like mirror 23 is made of a rectangular plate-like member and has one end adhered to a slope portion of the inclined groove 30 in a cantilevered state with an adhesive member such as a resin with the lower plate surface thereof used as a mirror surface. The plate thickness of the plate-like mirror 23 is set substantially equal to the depth of the inclined groove 30.

The plate width (length in side view in FIG. 1B) of the plate-like mirror 23 is slightly shorter than the width (length in side view in FIG. 1B) of the inclined groove 30. Therefore, before one end of the plate-like mirror 23 is adhered to the inclined groove 30, that is, in a state before the one end is fixed, the plate-like mirror 23 is slightly displaceable in the direction of the slope of the bottom surface within the inclined groove 30 and is capable of changing the angle of rotation around the axial line parallel to the Y-axis. Such a change enables adjustment of the orientation of the mirror surface of the plate-like mirror 23 when manufacturing the optical scanning device 10. By adhesion of one end of the plate-like mirror 23 to the inclined groove 30, the plate-like mirror is fixed so that it cannot be displaced.

The rotary type mirror 25 has a flat plate-like mirror portion 26 and a cylindrical fitting end portion 27 which is coupled to one end of the mirror portion 26 and fits into the through hole 31. The diameter of the fitting end portion 27 is slightly smaller than the diameter of the through hole 31. Therefore, before adhesion of the fitting end portion 27 to the through hole 31, i.e., in a state before fixing thereof, the rotary type mirror 25 is rotatable about the center line of the through hole 31 while fitting the fitting end portion 27 into the through hole 31, and can be tilted within a predetermined inclination angle range from a state in which the center line of the rotary type mirror 25 is aligned with the center line Co (FIG. 1B) of the through hole 31. Therefore, the rotary type mirror 25 is rotatably displaceable in a larger angle range than the plate-like mirror 23. Such a rotatable and tiltable configuration enables adjustment of the orientation of the mirror surface as the lower surface of the mirror portion 26 when manufacturing the optical scanning device 10, and then allows the fitting end portion 27 to be fixed so as not to rotate by adhering it with an adhesive member such as a resin.

The rotating mirror 21 of the MEMS optical deflector 20 is not positioned directly below the rotary type mirror 25 with respect to the rotary type mirror 25 but is positioned on the front side, i.e., on the negative side with respect to the rotary type mirror 25 in the X-axis direction. In other words, the rotating mirror 21 of the MEMS optical deflector 20 is positioned obliquely downward when viewed from the rotary type mirror 25.

As will be described later, this configuration contributes to causing the light beam Lp from the optical scanning device 10 to be emitted obliquely forward rather than perpendicular to the substrate 15 in regard to its emission direction. This configuration ensures that when the optical scanning device 10 is attached to the temple of a spectacle body as a spectacles-type video display device 155 (video scanning device of smart glass) described as a use example of the optical scanning device in the next FIG. 3, the light emitted from the optical scanning device 10 reaches the lens inner surface of the spectacle body without being interfered by the user's face from a slight gap between an imaging device and the user's face.

Figure 3:
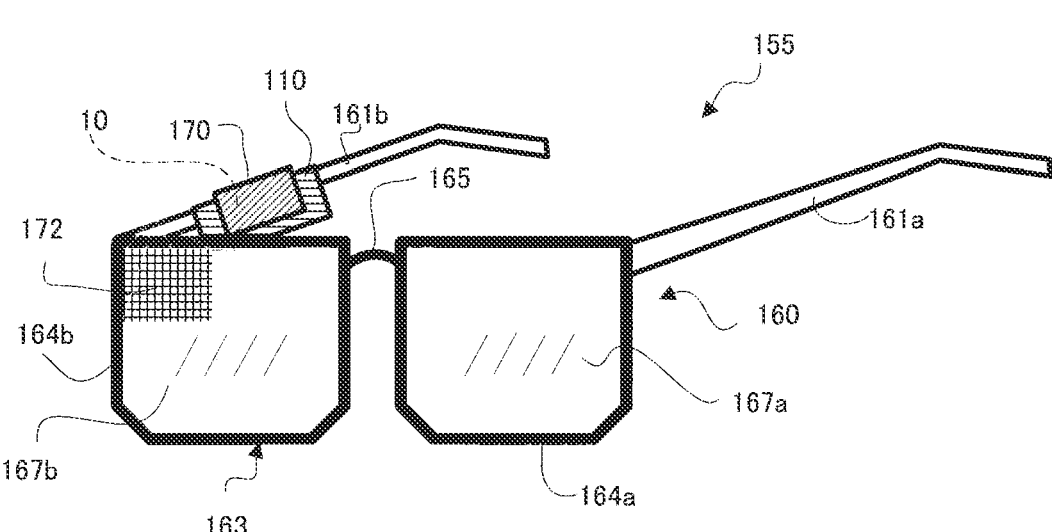
FIG. 3 is a view showing a spectacles-type video display device 155 as an application example of the optical scanning device.

FIG. 3 is a view showing the spectacles-type video display device 155 as an application example of the optical scanning device 10. The spectacles-type video display device 155 will be briefly described. The spectacles-type video display device 155 includes a spectacle body 160 and a video generation device 110 detachably attached to the spectacle body 160 by a mounting member such as a clip 170. The spectacle body 160 includes left and right temples 161a and 161b and a front frame 163 coupled to front ends of the left and right temples 161a and 161b at both left and right ends. The front frame 163 further includes left and right lens frame portions 164a and 164b, and a bridge 165 connecting the left and right lens frame portions 164a and 164b.

The optical scanning device 10 is incorporated in one-row arrangement within the video generation device 110 together with other elements (for example: buffer amplifier for MEMS sensor and LDD (laser driver)) along the extension direction of the temple 161b of the spectacle body 160. Incidentally, in this one-row arrangement, the optical scanning device 10 is arranged in the forefront, that is, closest to the lens 167 side. Thus, the light beam Lp (FIG. 1B or FIG. 4A) emitted from the optical scanning device 10 scans a scanning region 172 as a region on the inner surface side of the lens 167. The scanning region 172 is a half mirror, and the light beam Lp is reflected by the scanning region 172 to generate an image on the user's retina with the retina as a screen.

The cover 33 (FIG. 1B) extends along the contour of the uprising plate portion 13b above the substrate 15, and is placed over the uprising plate portion 13b to fix an opening peripheral edge on the lower end side thereof to the peripheral edge of the bottom plate portion 13a. The cover 33 has a transparent portion 34 at least at a portion where a light beam Lp to be described later is emitted from the optical scanning device 10 as scanning light.

(Configuration of Main Part)

Figure 4A:
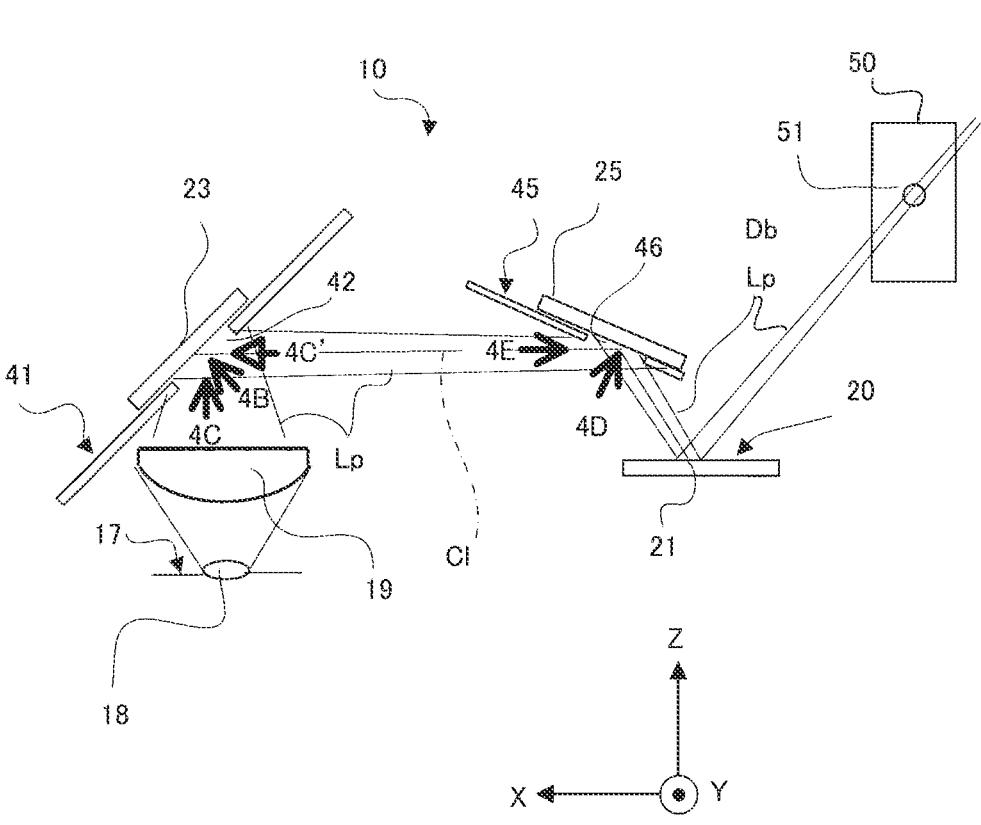
FIG. 4A is a detailed diagram of a positional relationship of optical elements of an optical scanning device in which an optical path of a light beam is arranged.
Figure 4B:
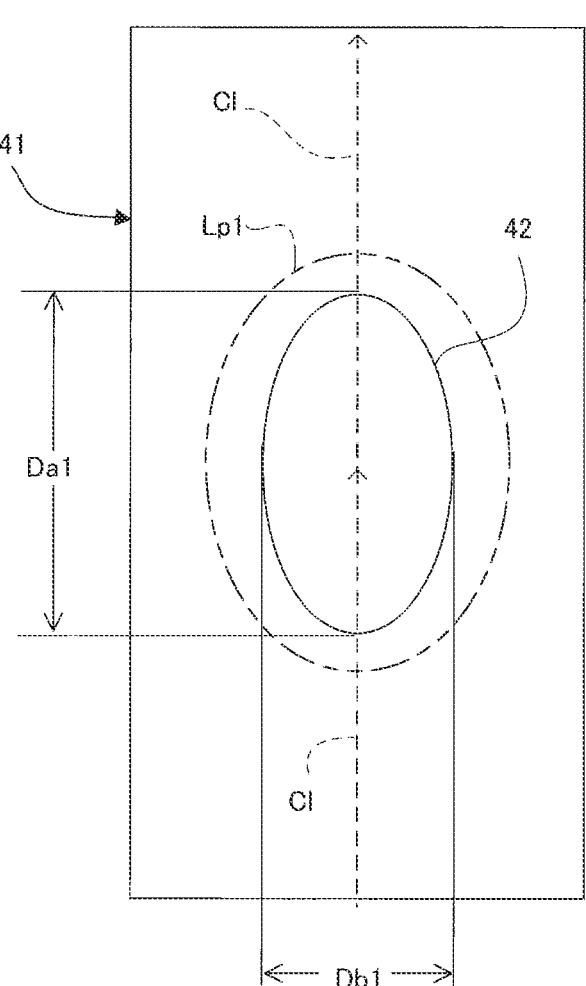
FIG. 4B is a view taken along arrow 4B in FIG. 4A.
Figure 4C:
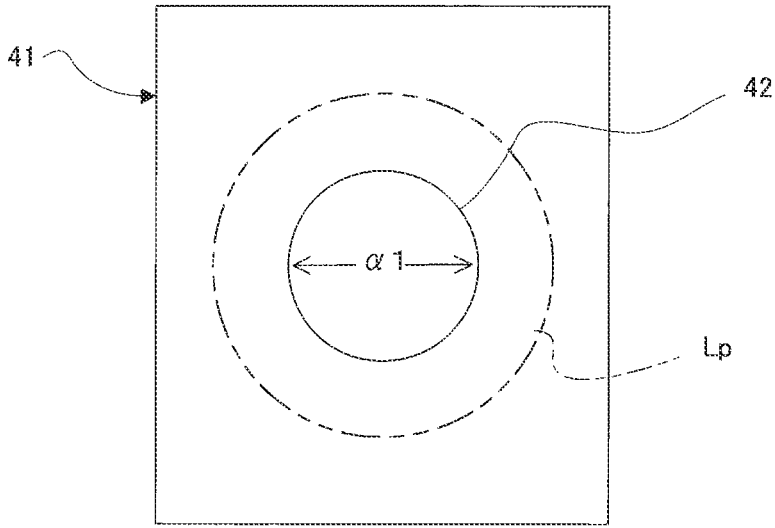
FIG. 4C is a view taken along arrow 4C in FIG. 4A.
Figure 4D:
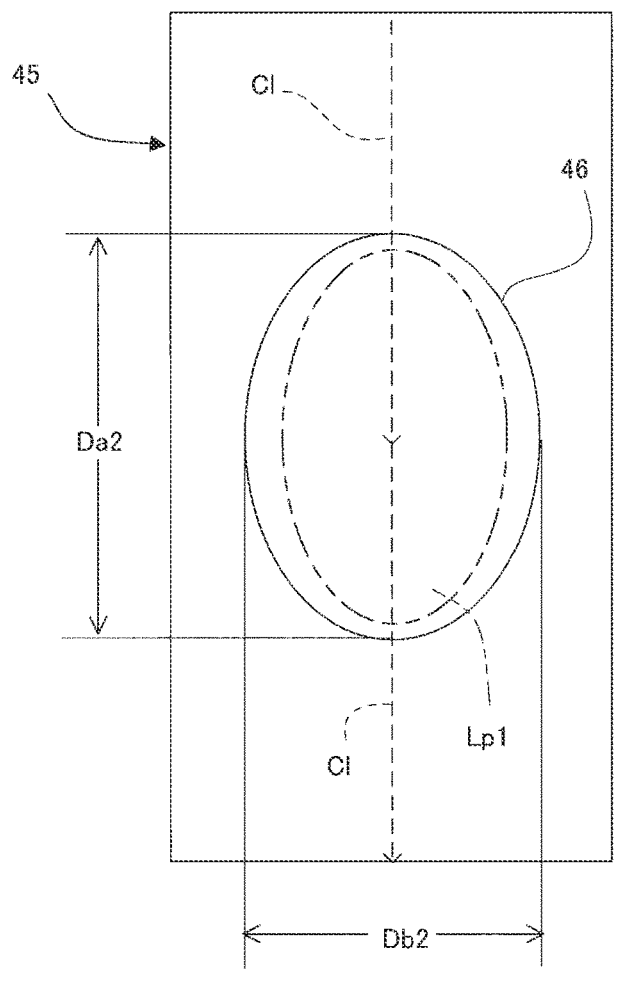
FIG. 4D is a view taken along arrow 4D in FIG. 4A.
Figure 4E:
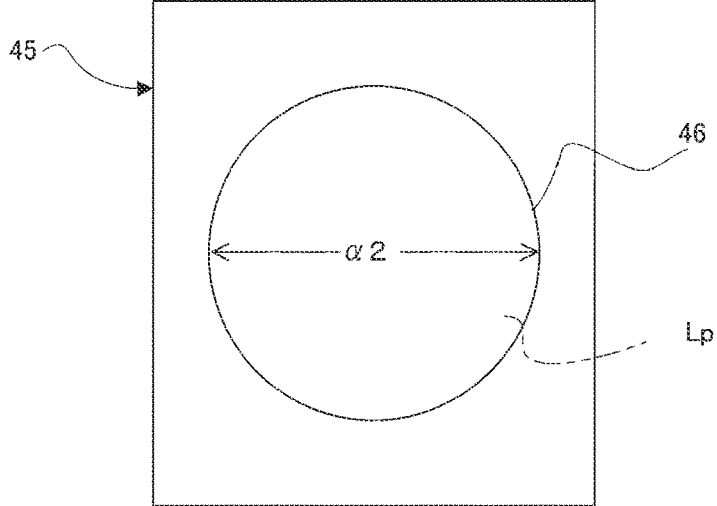
FIG. 4E is a view taken along arrow 4E in FIG. 4A.

FIG. 4A is a detailed view of a positional relationship of optical elements of the optical scanning device 10 in which the optical path of the light beam Lp is arranged, FIG. 4B is a view taken along arrow 4B in FIG. 4A, FIG. 4C is a view taken along arrow 4C in FIG. 4A, FIG. 4D is a view taken along arrow 4D in FIG. 4A, and FIG. 4E is a view taken along arrow 4E in FIG. 4A. FIG. 4C is also a view taken along arrow 4C' in FIG. 4A. Incidentally, the arrows 4B to 4E and 4C' in FIG. 4A are all located on the optical axis C1.

Incidentally, in FIG. 4A, the right side on the drawing is forward in the negative direction of the X-axis, and the left side thereon is backward in the positive direction of the X-axis.

The lens 19 and the plate-like mirror 23 are arranged directly above the emission unit 18. The plate-like mirror 23 has a mirror surface which faces obliquely downward toward the rotary type mirror 25. A shielding plate 41 has an elliptical aperture 42 and is fixed (e.g., glued) to the mirror surface of the plate-like mirror 23. Consequently, the mirror surface of the plate-like mirror 23 allows the light beam Lp to enter and exist only within the range of the elliptical aperture 42.

The lens 19 is positioned between the emission unit 18 and the plate-like mirror 23 in the optical path of the light beam Lp and emits the light beam Lp emitted from the emission unit 18 while expanding in the radial direction so as to converge on a predetermined point (in this example, a light spot 51 on a projection screen 50) downstream of the MEMS optical deflector 20. Thus, after the light beam Lp exits through the lens 19, it advances to the predetermined point while shrinking in a light radial direction.

In the rotary type mirror 25, the mirror surface of the mirror portion 26 faces obliquely downward toward the plate-like mirror 23 side. The optical axis C1 extends parallel to the substrate 15 between the plate-like mirror 23 and the mirror portion 26. A shielding plate 45 has an elliptical aperture 46 and is fixed (e.g., glued) to the mirror surface of the mirror portion 26. Thus, the light beam Lp is incident only within the range of the elliptical aperture 46 on the mirror surface of the mirror portion 26 of the rotary type mirror 25. The plate-like mirror 23 has a lower surface as the mirror surface. The shielding plate 41 has the elliptical aperture 42 and is fixed to the mirror surface of the plate-like mirror 23. Thus, the mirror surface of the plate-like mirror 23 allows the light beam Lp to enter and exit only within the range of the elliptical aperture 42.

The light spot 51 is generated on the projection screen 50 as a condensing point of the light beam Lp by the lens 19. The projection screen 50 will be a location a predetermined distance away from the optical scanning device 10 along the optical path of the light beam Lp. In the optical scanning device 10 installed in the spectacles-type video display device 155 (FIG. 3), the projection screen 50 becomes the user's retina. Incidentally, the light beam Lp emitted from the emission unit 18 of the VCSEL 17 is laser light weakened enough to not harm human eyes.

(Operation)

The light beam Lp is emitted from the emission unit 18 of the VCSEL 17 while spreading radially upward (positive direction in the Z-axis direction) perpendicular to the substrate 15. After passing through the lens 19, the light beam Lp advances along the optical path while reducing in the radial direction until it reaches the condensing point (light spot 51 in the optical scanning device 10) of the lens 19. After passing through the lens 19, the light beam Lp passes through the elliptical aperture 42 of the shielding plate 41 and reaches the plate-like mirror 23.

In FIG. 4B, the elliptical aperture 42 is an ellipse as shown in FIG. 4B when viewed from the direction perpendicular to the shielding plate 41 (the normal direction of the plate-like mirror 23). The shielding plate 41 has a surface inclined with respect to the optical axis C1. The major axis of the elliptical aperture 42 overlaps the optical axis C1 of the light beam Lp when viewed from the direction (normal direction) perpendicular to the shielding plate 41. In FIG. 4B, Da1 and Db1 are the dimensions of the major axis and minor axis of the ellipse. Further, Da1/Db1 is defined as β1.

In FIG. 4C, when the direction of the optical axis C1 is viewed from the upstream side (lens 19 side) and the downstream side (rotary type mirror 25 side), the elliptical aperture 42 is closer to a perfect circle than when viewed from the direction (normal direction) perpendicular to the shielding plate 41. That is, when the elliptical aperture 42 is viewed from the direction of the optical axis C1, it is a circular shape in which the ratio of the major axis to the minor axis of the ellipse in FIG. 4C (in FIG. 4C, the elliptical aperture 42 is an ellipse including a perfect circle) is closer to 1 than β1 (1<β1). In FIG. 4C, the vertical axis becomes the major axis and the horizontal axis becomes the minor axis. Here, the diameter of the circle (the average value of the major and minor axes in the case of the ellipse) when viewed along the optical axis C1 is defined as $\alpha$1.

The light beam Lp which is emitted from the emission unit 18 of the VCSEL 17, passes through the lens 19 and is condensed becomes a shape close to a perfect circle at any position on the optical axis C1 when viewed in the direction of the optical axis C1 (FIG. 4C). The light beam Lp generates an elliptical irradiation shape Lp1 at the shielding plate 41 arranged obliquely with respect to the optical axis C1 (FIG. 4B). The elliptical aperture 42 becomes an ellipse which is substantially similar in shape to the irradiation shape Lp1 but slightly smaller than it. Also, the elliptical aperture 42 is included inside the irradiation shape Lp1. By doing so, the light beam Lp holds the shape close to the original perfect circle when viewed from the direction of the optical axis C1 even after being reflected by the plate-like mirror 23 and passing through the elliptical aperture 42.

However, the act of making the elliptical aperture 42 into the shape substantially similar to the irradiation shape Lp1 is limited to the case where the shielding plate 41 is thin in thickness. When the thickness is taken into consideration, the shape is slightly deformed from the similar shape. Further, since the plate-like mirror 23 is adjusted in inclination angle as described above, the inclination angle of the fixed shielding plate 41 changes, and the accurate shape of the irradiation shape Lp1 is determined after the adjustment. For this reason, the relationship between the shapes of the elliptical aperture 42 and the irradiation shape Lp1 may deviate from similarity, but the direction of the major axis always becomes the direction of inclination of the shielding plate 41 with respect to the optical axis C1. Further, the ellipse of the elliptical aperture 42 and the ellipse of the irradiation shape Lp1 have the intersection of the major and minor axes as the central position at the same location (FIG. 4B).

Here, in order to consider an illuminance distribution in the cross section of the light beam Lp, a predetermined value $\gamma$1 is defined for the illuminance $\gamma$ in the cross section. Incidentally, the illuminance $\gamma$ in the cross section of the light beam Lp is maximum in the center of the cross section, i.e., at the point of intersection with the optical axis C1, and decreases as it moves away from the optical axis C1 in the radial direction, finally resulting in 0. The irradiation shape Lp1 is defined as a region in which the illuminance $\gamma$ is equal to or greater than a predetermined value $\gamma$2 (0<$\gamma$2<$\gamma$1). The predetermined values $\gamma$1 and $\gamma$2 are 0.5 and 0.3 times the maximum value of the illuminance $\gamma$, respectively.

Incidentally, for convenience of description, it is assumed that a light ray passing through each position on the cross section reaches the projection screen 50 while maintaining the illuminance at the position (where a loss actually exists). Further, the illuminance of the light spot 51 on the projection screen 50 is assumed to be the illuminance generated by converging the incident points of the respective light rays on the projection screen 50 to the light spot 51.

By passing through the elliptical aperture 42, the light beam Lp is cut in the peripheral edge in the cross section, in other words, in a radially outer region in which the illuminance $\gamma$ is less than $\gamma$1. The region inside the irradiation shape Lp1 and outside the elliptical aperture 42 in FIG. 4B is the region to be cut. As a result, the light beam Lp immediately after being reflected by the plate-like mirror 23 and emitted from the elliptical aperture 42 becomes a light beam which is $\gamma$1 or more in the illuminance $\gamma$ and circular in cross section. The light beam Lp then travels along the optical path toward the rotary type mirror 25.

The light beam Lp passes through the elliptical aperture 46 of the shielding plate 45 and reaches the rotary type mirror 25. As with the elliptical aperture 42 of the shielding plate 41, the elliptical aperture 46 is an ellipse when viewed in the direction of the optical axis C1 from the direction (the normal direction of the rotary type mirror 25) perpendicular to the shielding plate 45 (FIG. 4D). An irradiation shape Lp2 of the irradiation region of the light beam Lp within the elliptical aperture 46 is an ellipse and is generated inside the ellipse of the elliptical aperture 46.

A dimension ratio $\beta$ between the major and minor axes of the elliptical aperture 46 is assumed to be $\beta$2 (=Da2/Db2). There is a relationship of $\beta$1≠$\beta$2.

When the optical axis direction is viewed from the upstream side (plate-like mirror 23 side) and the downstream side (MEMS optical deflector 20 side) (FIG. 4E), the elliptical aperture 46 is closer to a perfect circle than when viewed from the vertical direction, i.e., a circular shape in which the ratio between the major and minor axes is closer to 1 than $\beta$2. The diameter $\alpha$ of this circle is assumed to be $\alpha$2. $\alpha$1>$\alpha$2 is made.

Since the elliptical apertures 42 and 46 are different in the angle of inclination with respect to the optical axis C1, the shapes of the ellipses are not similar. Thus, even though the elliptical apertures 42 and 46 are both circular when viewed from the direction of the optical axis C1, it is possible to set $\beta$1≠$\beta$2. It is preferable to make the major axis of the elliptical aperture longer as the shielding plate arranged to be inclined at an angle at which the inclination angle is large relative to the optical axis C1 of the light beam Lp (the direction perpendicular to the optical axis C1 is defined as an inclination angle=0°) is taken, that is, to increase the dimension ratio $\beta$.

The light beam Lp passes through the elliptical aperture 46 and is then irradiated to the rotary type mirror 25 in an irradiation shape Lp2. The irradiation shape Lp2 is an elliptical shape smaller than the elliptical aperture 46.

Although not shown in FIG. 4A, the light beam Lp generates diffracted light when passing through the elliptical aperture 42 of the shielding plate 41. The diffracted light is weal light which spreads over a range larger than the light beam Lp. The shielding plate 45 prevents the diffracted light from being reflected by the rotary type mirror 25. Further, the irradiation shape Lp2 is smaller than the elliptical aperture 46, and the entirety of the irradiation shape Lp2 is accommodated inside the elliptical aperture 46, thereby preventing the diffracted light from being further generated from the shielding plate 45.

The light beam Lp emitted from the elliptical aperture 46 travels obliquely downward (direction away from the plate-like mirror 23 in the X-axis direction) and reaches the center of the rotating mirror 21 of the MEMS optical deflector 20.

The rotating mirror 21 of the MEMS optical deflector 20 rotates around two mutually intersecting axes with non-resonance and resonance, respectively. The two axes are parallel to the X-axis and the Y-axis respectively when the rotating mirror 21 is stationary. The light beam Lp emitted from the rotating mirror 21 becomes scanning light for two-dimensional scanning due to the reciprocating rotation of the rotating mirror 21 about the two axes. Incidentally, the resonant frequency and the non-resonant frequency are, for example, 14 kHz or higher and 60 Hz, respectively. Further, the (non-resonance side) reciprocating rotation angle of the rotating mirror 21 about the X-axis is smaller than the (resonance side) reciprocating rotation angle of the rotating mirror 21 about the Y-axis.

Incidentally, in the embodiment, the reciprocating rotation of the rotating mirror 21 about the resonant axis and the reciprocating rotation of the rotating mirror 21 about the non-resonant axis will be explained as respectively corresponding to the horizontal and vertical directions of the projection screen 50 to be described later.

The light beam Lp becomes scanning light by being reflected by the rotating mirror 21 and is emitted from the optical scanning device 10 to scan on the projection screen 50 outside the optical scanning device 10. A light spot 51 is generated at an irradiation point of the light beam Lp on the projection screen 50. The light spot 51 scanning over the projection screen 50 generates a rectangular image region with the horizontal and vertical directions taken as the major and minor sides respectively.

The elliptical aperture 42 on the upstream side is larger in area than the elliptical aperture 46 on the downstream side. Both the elliptical apertures 42 and 46 are circular when viewed from the upstream side in the direction of the optical axis C1, but the elliptical aperture 42 on the upstream side is larger in its circle diameter than the elliptical aperture 46 on the downstream side.

By cutting the periphery of the light beam Lp in two stages of the elliptical aperture 42 of the shielding plate 41 and the elliptical aperture 46 of the shielding plate 45, the shaping effect of the cross section of the light beam Lp can be enhanced. Further, the contrast between the light spot 51 and its surroundings can be improved more than one-step periphery cut.

Further, the shielding plates 41 and 45 are attached to the plate-like mirror 23 and the rotary type mirror 25 by means of bonding such as adhesion or the like.

In the above description and FIG. 4A, it is assumed that the projection screen 50 is a plane perpendicular to the optical axis C1 in a state in which the MEMS optical deflector 20 is stopped. The light spot 51 is designed so that the ratio of the major axis to the minor axis approaches 1 with the perfect circle being ideal.

However, the projection screen 50 may be a surface inclined with respect to the optical axis C1 in the state in which the MEMS optical deflector 20 is stopped, depending on the application and the arrangement of members. In the case of the spectacles-type video display device 155 of FIG. 3, the retina corresponds to the projection screen 50, but the optical scanning device 10 may be placed at a position where the optical axis C1 of the light beam Lp in the stopped state of the MEMS optical deflector 20 is tilted with respect to the assumed position of the retina. In that case, as compared to the case where the projection screen 50 is the plane perpendicular to the optical axis C1, the formed light spot 51 is deformed into a shape extending in the direction of inclination of the optical axis C1 of the light beam Lp. Such deformation of the light spot 51 due to the position of the projection screen 50 may also occur in other applications, a projector, etc. In the case of the projector, a wall perpendicular to the plane on which the projector is placed can be assumed as the projection screen 50.

Thus, it is preferable to form the sectional shape perpendicular to the optical axis C1 at the light beam Lp emitted from the optical scanning device 10 into an elliptical shape having a major axis in the inclination and vertical directions of the optical axis C1 to the projection screen 50 assumed in advance in the stopped state of the MEMS optical deflector 20.

Figure 6:
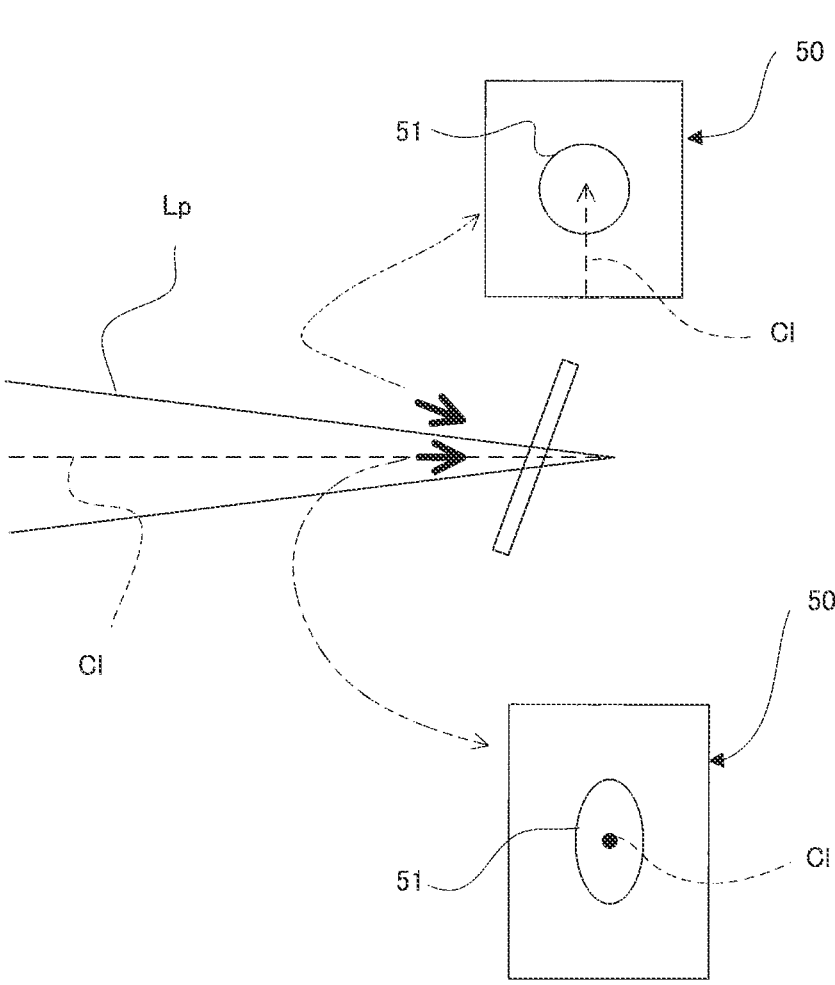
FIG. 6 is a view showing the shape of a light spot when a projection screen is inclined with respect to an optical axis.

FIG. 6 is a view showing the shape of the light spot 51 when the projection screen 50 is inclined with respect to the optical axis C1. The inclination angle of the projection screen 50 is defined as 0° when the screen surface of the projection screen 50 becomes a plane perpendicular to the optical axis C1 of the light beam Lp. The light beam Lp whose cross section perpendicular to the optical axis C1 is elliptical, becomes a perfect circle on the projection screen 50. Even if the light beam Lp is not exactly formed into the perfect circle, the ratio of the major axis to the minor axis of the light spot 51 on the projection screen 50 can be brought close to 1 by using such a light beam Lp.

The sectional shape of the light beam Lp perpendicular to the optical axis C1 is called a cross-sectional shape. The cross-sectional shape of the light beam Lp can be shaped by adjusting the shapes of the elliptical aperture 42 of the shielding plate 41 and the elliptical aperture 46 of the shielding plate 45.

In the optical scanning device 10, the contrast of the light spot 51 on the projection screen 50 is enhanced by cutting the periphery of the light beam Lp with the elliptical apertures 42 and 46. As a result, the quality of video viewed by the user can be enhanced.

Incidentally, in the above embodiment, the diameter of the cross section of the light beam Lp is made narrow by condensing by the lens 19 (FIG. 4A), but the light beam Lp may be parallel light whose diameter of cross section is constant. Incidentally, even when the light is made to be parallel light, it is referred to as the lens 19.

Also, the number of VCSELs 17 is not limited to one. For example, VCSELs 17 of three colors of RGB may be used side by side. In this case, the plate-like mirror 23 is arranged for each VCSEL 17. In addition, since the plate-like mirror 23 is a dichroic mirror, each VCSEL 17 can be aligned.

Further, although the two shielding plates 41 and 45 are used, at least one shielding plate is sufficient in the present invention.

Figure 7:
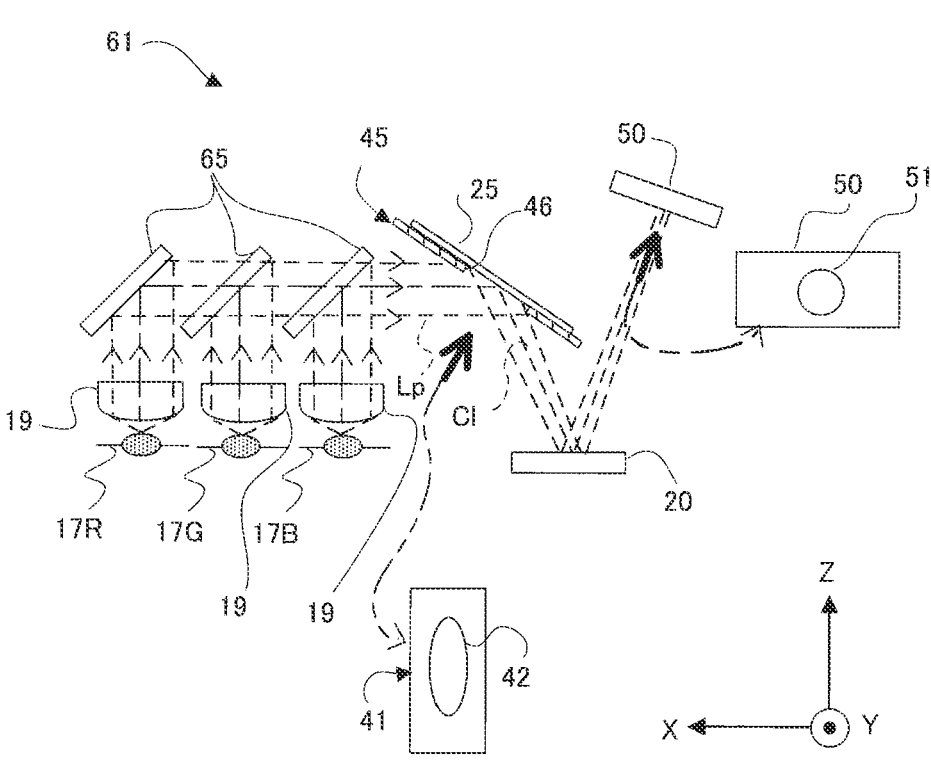
FIG. 7 is a schematic view of a main part of an optical scanning device equipped with VCSELs of RGB.

FIG. 7 is a schematic view of a main part of an optical scanning device 61 equipped with VCSELs 17R, G, and B of RGB. The VCSELs 17R, G, and B are mounted in a row in an X-axis direction on the common substrate 15 (FIG. 1A). A lens 19 and a dichroic mirror 65 are arranged directly above each of the VCSELs 17R, G, and B so as to face each other.

The respective light beams of R, G, and B emitted directly upward from the VCSELs 17R, G, and B pass through the lenses 19 and the dichroic mirrors 65 to generate an integrated light beam Lp. The light beam Lp is directed toward a rotary type mirror 25 in parallel to the substrate 15, cut at the peripheral edge thereof by an elliptical aperture 46 of the shielding plate 45, and then directed toward a MEMS optical deflector 20.

The optical scanning device 61 does not have the shielding plate 41. The elliptical aperture 46 of the shielding plate 45 is smaller than the irradiation region of the light beam Lp for the shielding plate 45, and has the function of shaping the light beam Lp, i.e., the same function as that of the elliptical aperture 42 in the embodiment of FIG. 4A.

Another Embodiment

Figure 5:
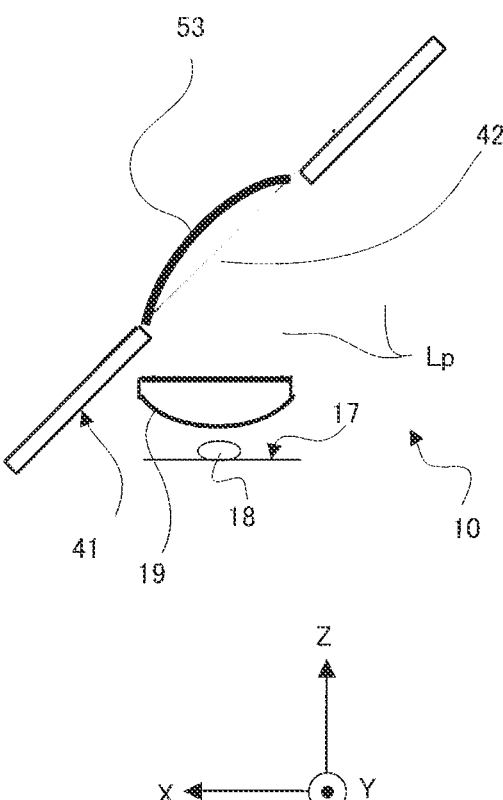
FIG. 5 is a configuration view of a main part of an optical scanning device having a concave mirror instead of a plate-like mirror.

FIG. 5 is a configuration view of a main part of an optical scanning device 10 having a concave mirror 53 instead of the plate-like mirror 23. The concave mirror 53 is fixed (e.g., glued) to a shielding plate 41 at its peripheral edge so as to face an elliptical aperture 42 from the upper surface side of the shielding plate 41. The concave mirror 53 can also be manufactured by integral molding with the shielding plate 41 using a predetermined mold form, for example. When the concave mirror 53 is used instead of the plate-like mirror 23, one end of the shielding plate 41 is extended toward an inclined groove 30 (FIG. 2, etc.) and directly fixed to the inclined groove 30.

Modifications, Etc.

In the optical scanning device 10 of the embodiment, the VCSEL 17 is used as the light source. The light source of the present invention is not limited to the VCSEL 17, and other than the VCSEL 17, for example, an edge emitting laser can also be selected.

In the optical scanning device 10, the VCSEL 17 emits light directly above the light beam Lp. In the optical scanning device of the present invention, the light source does not have to emit a light beam upward (e.g., directly above). In the optical scanning device of the present invention, even if the light source emits the light beam in a direction other than upward, it is sufficient that a plurality of optical path generation mirrors generate an optical path so as to make the light beam emitted from the light source enter the mirror portion of the MEMS optical deflector.

In the optical scanning device 10, the shielding plates 41 and 45 are both attached to a plate-like mirror 23 and a rotary type mirror 25 as their corresponding optical path generation mirrors by mounting or the like. In the optical scanning device of the present invention, the shielding plate can also be arranged on the optical path upstream of the corresponding optical path generation mirror separately from the corresponding optical path generation mirror. In that case, the shielding plate arranged on the upstream side of the corresponding optical path generation mirror separately from the corresponding optical path generation mirror must be arranged so as not to interfere with the optical path on the downstream side of the corresponding optical path generation mirror.

In the optical scanning device 10, the shielding plates 41 and 45 are arranged parallel to the plate-like mirror 23 and the rotary type mirror 25 as the corresponding optical path generation mirrors. On the other hand, since the mirror surface is a curved surface in the concave mirror 53 in FIG. 5, the concept of parallelism to the shielding plate 41 cannot be defined. Including the plate-like mirror 23, the rotary type mirror 25, and the concave mirror 53, the normal line is set at the intersection where the incident side optical axis C1, the shielding plate, and the optical path generation mirror intersect, and the normal line of the shielding plate with respect to the incident side optical axis C1 and the normal line of the optical path generation mirror are defined as the inclination angles of the shielding plate and the optical path generation mirror. The inclination angles of the shielding plate and the optical path generation mirror at that time become 0° when the inclination angle of the plane perpendicular to the light beam Lp at the intersection is defined as 0°.

DESCRIPTION OF REFERENCE NUMERALS

10, 61 . . . optical scanning device
17 . . . VCSEL
19 . . . lens
20 . . . MEMS optical deflector
21 . . . rotating mirror
23 . . . plate-like mirror (optical path generation mirror)
25 . . . rotary type mirror (optical path generation mirror)
41, 45 . . . shielding plate

42, 46 . . . elliptical aperture
53 . . . concave mirror (optical path generation mirror)

The invention claimed is:

1. An optical scanning device, comprising:
a substrate;
a light source which is mounted on the substrate and emits a light beam,
a MEMS optical deflector which has a mirror portion whose upper surface side is a mirror surface, and an actuator which reciprocally rotates the mirror portion around an axis, and is mounted on the substrate;
at least one optical path generation mirror configured to generate an optical path which causes the light beam emitted from the light source to enter the mirror portion of the MEMS optical deflector;
a lens arranged between the light source and the optical path generation mirror on which light emitted from the light source first enters in the optical path; and
a first shielding plate, with any of the at least one optical path generation mirror as a corresponding optical path generation mirror to the first shielding plate, the corresponding optical path generation mirror being upstream of the first shielding plate on the optical path,
wherein the first shielding plate includes a first elliptical aperture arranged in a same inclining direction as an inclining direction of the corresponding optical path generation mirror with respect to an optical axis of the optical path.

2. The optical scanning device according to claim 1, wherein the first shielding plate is attached to the corresponding optical path generation mirror, and
wherein when a direction of the optical axis is viewed from a downstream side with respect to the corresponding optical path generation mirror in the optical path, the first elliptical aperture of the first shielding plate becomes a circular shape in which a ratio of a major axis of the first elliptical aperture to a minor axis of the first elliptical aperture is closer to 1 than when the first shielding plate is viewed from a vertical direction.

3. The optical scanning device according to claim 1, further comprising:
a second shielding plate having a second elliptical aperture, which is provided downstream of the first shielding plate on the optical path,
wherein ratios of major axes of the elliptical apertures of the respective shielding plates to minor axes of the elliptical apertures are different from each other.

4. The optical scanning device according to claim 3, wherein an aperture area of the elliptical aperture of the second shielding plate is smaller than an aperture area of the elliptical aperture of the first shielding plate.

5. The optical scanning device according to claim 1, wherein the at least one optical path generation mirror includes a concave mirror.

6. The optical scanning device according to claim 1, further comprising:
a second shielding plate having a second aperture, which is arranged downstream of the first shielding plate on the optical path,
wherein the light beam forms an irradiation region larger than the first elliptical aperture with respect to the first shielding plate, and
wherein the second shielding plate is arranged at a position where the light beam passes through an inside of the second aperture.

* * * * *